(12) United States Patent
Dickow et al.

(10) Patent No.: US 10,750,322 B2
(45) Date of Patent: Aug. 18, 2020

(54) MOBILE DEVICE RESIDENT VEHICLE ZONE TRACKING

(71) Applicant: MYINE ELECTRONICS, INC., Ferndale, MI (US)

(72) Inventors: Justin Dickow, Royal Oak, MI (US); Corey Maylone, Berkley, MI (US); Scott Smereka, Warren, MI (US); Joey Ray Grover, Madison Heights, MI (US)

(73) Assignee: Livio, Inc., Royal Oak, MI (US)

( * ) Notice: Subject to any disclaimer, the term of this patent is extended or adjusted under 35 U.S.C. 154(b) by 571 days.

(21) Appl. No.: 15/002,066

(22) Filed: Jan. 20, 2016

(65) Prior Publication Data

US 2017/0208438 A1 Jul. 20, 2017

(51) Int. Cl.
*H04W 4/029* (2018.01)
*H04W 4/40* (2018.01)
*H04W 4/80* (2018.01)
*H04W 64/00* (2009.01)
*H04W 8/00* (2009.01)

(52) U.S. Cl.
CPC ............ *H04W 4/029* (2018.02); *H04W 4/40* (2018.02); *H04W 4/80* (2018.02); *H04W 8/005* (2013.01); *H04W 64/003* (2013.01)

(58) Field of Classification Search
CPC ..... H04W 4/046; H04W 4/008; H04W 8/005; H04W 4/029; H04W 4/80; H04W 4/40; H04W 64/003
USPC ....... 455/414.1, 418, 41.1, 41.2, 569.2, 457, 455/456.1–456.6
See application file for complete search history.

(56) References Cited

U.S. PATENT DOCUMENTS

| | | | |
|---|---|---|---|
| 7,734,315 B2 * | 6/2010 | Rathus | H04B 1/082 455/410 |
| 9,775,100 B1 * | 9/2017 | Smereka | G01S 11/06 |
| 2007/0290554 A1 * | 12/2007 | Teshima | B60N 2/0244 307/10.1 |
| 2010/0041443 A1 * | 2/2010 | Yokota | H04M 1/6083 455/569.2 |
| 2011/0105097 A1 * | 5/2011 | Tadayon | H04W 4/025 455/418 |
| 2011/0111724 A1 * | 5/2011 | Baptiste | H04M 1/6075 455/404.1 |
| 2011/0275358 A1 * | 11/2011 | Faenger | H04W 8/24 455/420 |

(Continued)

*Primary Examiner* — Mong-Thuy T Tran
(74) *Attorney, Agent, or Firm* — Michael J. Spenner; Brooks Kushman P.C.

(57) ABSTRACT

Values may be tracked from wireless sensors of a vehicle indicative of distance between the mobile device and the sensors. When the values over time indicate approach and then departure of the device to a first side of the vehicle and consistent approach of the device to a second side of the vehicle, the device may be associated with a seating zone of an identified closest pair of the sensors. Wireless sensors may be proximate to entrances to a vehicle. The vehicle may track values from the sensors indicative of distance between a mobile device and the sensors; calculate pair values as sums of the values received from pairs of the sensors proximate vehicle entrances; and identify one of the entrances through which the mobile device passed according to the pair value with a minimum value closest to a distance between the pair of the sensors.

10 Claims, 7 Drawing Sheets

(56) References Cited

U.S. PATENT DOCUMENTS

| | | |
|---|---|---|
| 2011/0298924 A1 | 12/2011 | Miller et al. |
| 2012/0244877 A1 | 9/2012 | Margalef et al. |
| 2013/0079033 A1 | 3/2013 | Gupta et al. |
| 2014/0094151 A1* | 4/2014 | Klappert ............ H04M 1/6083 455/414.1 |
| 2014/0129051 A1 | 5/2014 | Gautama et al. |
| 2014/0179348 A1* | 6/2014 | Simon .................. H04W 4/027 455/456.1 |
| 2014/0187219 A1* | 7/2014 | Yang .................... H04W 4/046 455/418 |
| 2014/0213234 A1* | 7/2014 | Inselberg ............. H04W 4/021 455/418 |
| 2014/0309862 A1* | 10/2014 | Ricci ...................... G06F 21/00 701/36 |
| 2015/0050923 A1* | 2/2015 | Tu ......................... H04W 4/028 455/418 |
| 2015/0105100 A1* | 4/2015 | Magarida ............. G01S 5/0284 455/456.1 |
| 2015/0148989 A1 | 5/2015 | Cooper et al. |
| 2016/0036964 A1* | 2/2016 | Barfield, Jr. ...... H04M 1/72569 455/418 |
| 2016/0112846 A1* | 4/2016 | Siswick ............. G07C 9/00309 455/456.4 |
| 2016/0165031 A1* | 6/2016 | Gopinath ........... H04M 1/6091 455/569.2 |
| 2016/0337814 A1* | 11/2016 | Van Wiemeersch ........................ H04M 1/72569 |
| 2017/0182958 A1 | 6/2017 | Cuddihy et al. |
| 2019/0184855 A1 | 6/2019 | Raffa et al. |

\* cited by examiner

MOBILE DEVICE RESIDENT VEHICLE ZONE TRACKING

TECHNICAL FIELD

Aspects of the disclosure generally relate to determining and tracking a resident vehicle zone for a mobile device.

BACKGROUND

Sales of personal devices, such as smartphones and wearables, continue to increase. Thus, more personal devices are brought by users into the automotive context. Smartphones can already be used in some vehicle models to access a wide range of vehicle information, to start the vehicle, and to open windows and doors. Some wearables are capable of providing real-time navigation information to the driver. Device manufacturers are implementing frameworks to enable a more seamless integration of their brand of personal devices into the driving experience.

SUMMARY

In a first illustrative embodiment, a system includes a mobile device having a wireless transceiver and programmed to track values, from vehicle wireless sensors, indicative of distance between the wireless transceiver and the sensors; and when the values indicate approach and then departure of the device from a vehicle first side and consistent approach of the device to a vehicle second side, associate the device with a seating zone of an identified closest pair of the sensors.

In a second illustrative embodiment, a system includes wireless sensors of a vehicle; and a vehicle processor programmed to track values from the sensors indicative of distance between a mobile device and the sensors; calculate pair values as sums of the values received from pairs of the sensors proximate vehicle entrances; and identify one of the entrances through which the mobile device passed according to the pair value with a minimum value closest to a distance between the pair of the sensors.

In a third illustrative embodiment, a method includes associating, by a vehicle processor, a mobile device with a vehicle entrance proximate a pair of wireless vehicle sensors based on sensor values received from the pair of sensors having a smallest summed distance minimum value over a predetermined time period relative to summed values received from other sensor pairs.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Certain tasks within a vehicle environment may require knowledge about where a person sits in the vehicle. For example, if a person has an application installed on his or her mobile device to control the temperature of the seating zone in which the person resides, the vehicle or application may attempt to determine the seating zone of the person within the vehicle.

In some solutions, sensors may attempt an instantaneous triangulation of the mobile device within the vehicle to identify the device location. However, a mobile device might be located in a portion of the vehicle that is used for storage, such as the center console to which multiple persons within the vehicle might have access to place their devices, producing inconclusive results. In general, an ambiguous situation exists along a center line through the vehicle in implementations having sensors on either side of the vehicle; as such sensors may be unable to reliably determine ownership of the mobile device in question.

An improved system for the identification of ownership of mobile devices may be based on the common action of entering or exiting the vehicle, with the premise that a person will be in possession of their mobile device while entering or exiting the vehicle. A model of sensor data may be used to determine the passage of such a device through one of a predetermined set of identifiable entrances and exits in the vehicle, such as the driver's door, the front passenger door, and either of the rear doors in the vehicle. Using the model, the mobile device may be associated with the door of entry, and may be assumed to be the device of that passenger, regardless of later changes in device location. Further aspects of the disclosed approach are discussed in detail below.

Figure 1:
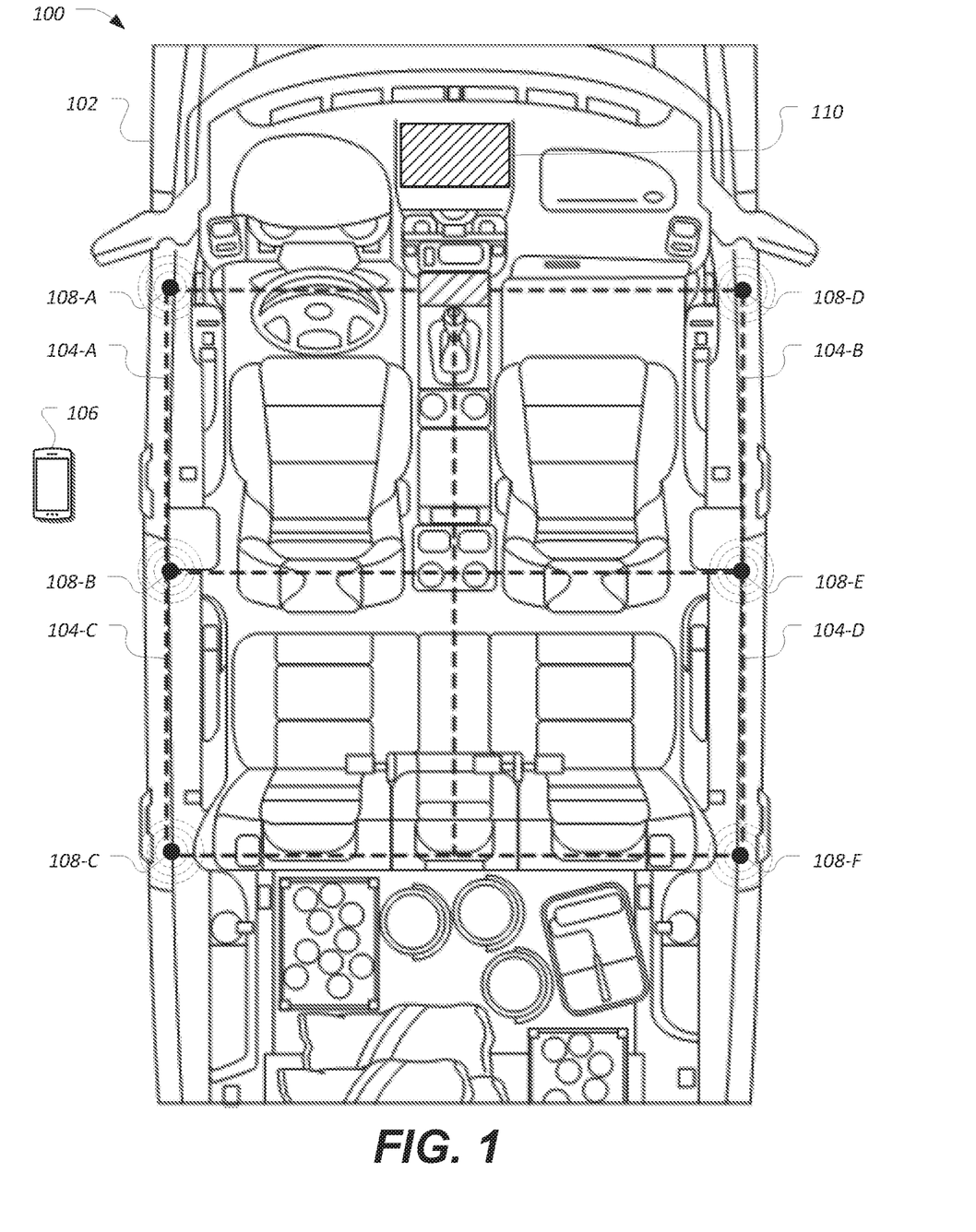
FIG. 1 illustrates an example system including a vehicle having an array of wireless sensors for use in assigning mobile devices to seating zones.

FIG. 1 illustrates an example system 100 including a vehicle 102 having an array of wireless sensors 108-A through 108-F (collectively 108) for use in assigning mobile devices 106 to seating zones 104-A through 104-D (collectively 104). The assignment of mobile devices 106 to seating zones 104 may be performed by the mobile devices 106 and/or by the vehicle computing system 110. The assignment of mobile devices 106 to seating zones 104 may be used, in an example, to determine which mobile device 106 is the driver device. It should be noted that the illustrated system 100 is merely an example, and more, fewer, and/or differently located elements may be used. For examples, different vehicles 102 may include more, fewer, or differently-arranged seating zones 104 and/or wireless sensors 108.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, seating, doors, towing ability and capacity, and storage volume.

The vehicle 102 interior may be divided into multiple zones 104, where each seating zone 104 may be associated with a seating position within the vehicle 102 interior. For instance, the front row of the illustrated vehicle 102 may include a first zone 104-A associated with the driver seating position, and a second zone 104-B associated with a front passenger seating position. The second row of the illustrated vehicle 102 may include a third zone 104-C associated with a driver-side rear seating position and a fourth zone 104-D associated with a passenger-side rear seating position.

The mobile devices 106 may be any of various types of portable computing device, such as cellular phones, tablet computers, smart watches, laptop computers, portable music players, or other devices capable of networked communication. The mobile devices 106 may provide network connectivity to a communications network via a device modem of the mobile devices 106. The communications network may provide communications services, such as packet-switched network services (e.g., Internet access, VoIP communication services), to devices connected to the communications network. An example of a communications network may include a cellular telephone network. To facilitate the communications over the communications network, mobile devices 106 may be associated with unique device identifiers (e.g., mobile device numbers (MDNs), Internet protocol (IP) addresses, BLUETOOTH identifications, etc.) to identify the communications of the mobile devices 106 over the communications network.

The wireless sensors 108 may include various types of wireless transceivers configured to communicate with the mobile devices 106. In an example, the wireless sensors 108 may include one or more of a BLUETOOTH module, a ZIGBEE transceiver, a Wi-Fi transceiver, an IrDA transceiver, an RFID transceiver, etc.) configured to communicate with compatible wireless transceivers of the mobile devices 106.

The wireless sensors 108 in the vehicle 102 may support BLE or another wireless technology that can provide distance or signal measurements to mobile devices 106 in relation to wireless communications between the mobile devices 106 and the wireless sensor 108. As a more specific example, the mobile devices 106 may communicate with wireless sensors 108 supporting BLE to capture received signal strength indication (RSSI) information provided by BLE protocol. In such a BLE example, the wireless sensors 108 of the vehicle 102 may advertise as BLE Peripherals, and an application executed by the mobile device 106 may scan for BLE Peripherals as a BLE Central.

Each wireless sensor 108 may be configured to provide signal strength information to indicate a stronger signal as the mobile device 106 approaches the wireless sensor 108, and a weaker signal as the mobile device 106 departs from the wireless sensor 108. As another possibility, each wireless sensor 108 may be configured to provide distance information indicating a measure of the distance between the wireless sensor 108 and the mobile devices 106 that becomes smaller as the mobile devices 106 approaches the wireless sensor 108, and that becomes greater as the mobile device 106 departs from the wireless sensor 108.

The wireless sensors 108 may be arranged to surround the entrances and exits to the different seating zones 104 of the vehicle 102. In the illustrated example, the wireless sensors 108-A and 108-B surround the entrance to the seating zone 104-A, the wireless sensors 108-B and 108-C surround the entrance to the seating zone 104-C, the wireless sensors 108-D and 108-E surround the entrance to the seating zone 104-B, and the wireless sensors 108-E and 108-F surround the entrance to the seating zone 104-D. In many cases, the wireless sensors 108 may be located in the vehicle in the pillars between the entrances or doors. Continuing with the illustrated example, the wireless sensor 108-A may be located in the driver-side A-pillar, the wireless sensor 108-B may be located in the driver-side B-pillar, the wireless sensor 108-C may be located in the driver-side C-pillar, the wireless sensor 108-D may be located in the passenger-side A-pillar, the wireless sensor 108-E may be located in the passenger-side B-pillar, and the wireless sensor 108-F may be located in the passenger-side C-pillar.

Variations on the number and arrangement of zones 104 are possible. For instance, an alternate second row may include an additional fifth zone 104-E of a second-row middle seating position (not shown). Or, a vehicle 102 having a third row may have an additional fifth zone 104-E behind the third zone 104-C and an additional sixth zone 104-F behind the fourth zone 104-D (not shown). It should be noted that differences in the zones 104 may affect the arrangement of wireless sensors 108. For instance, a vehicle having additional rows of doors may require additional wireless sensors 108 to surround the doors. In general, each side of the vehicle 102 may include (n+1) wireless sensors 108, where n is the number of doors. Assuming the number n of doors is even, the vehicle 102 may include (n+2) wireless sensors 108 in total. For example, a vehicle 102 having four doors will include six sensors placed in a grid pattern in the vehicle 102, having two columns and three rows.

The vehicle computing system 110 may be configured to provide telematics services to the vehicle 102. These services may include, as some non-limiting possibilities, navigation, turn-by-turn directions, vehicle health reports, local business search, accident reporting, and hands-free calling. In an example, the vehicle computing system 110 may include the SYNC system manufactured by The Ford Motor Company of Dearborn, Mich.

The vehicle computing system 110 may be further configured to communicate with other components of the vehicle 102 via one or more in-vehicle networks. The in-vehicle networks may include one or more of a vehicle controller area network (CAN), an Ethernet network, and a media oriented system transfer (MOST), as some examples. The in-vehicle networks may allow the vehicle computing system 110 to communicate with other vehicle systems, such as a vehicle modem (which may not be present in some configurations), a global positioning system (GPS) module configured to provide current vehicle location and heading information, and various other vehicle controllers.

The vehicle computing system 110 may receive input from human-machine interface (HMI) controls 114 configured to provide for occupant interaction with the vehicle 102. For instance, the vehicle computing system 110 may interface with one or more buttons or other HMI controls configured to invoke functions on the vehicle computing system 110 (e.g., steering wheel audio buttons, a push-to-talk button, instrument panel controls, etc.). The vehicle computing system 110 may also drive or otherwise communicate with one or more displays configured to provide visual output to vehicle occupants. In some cases, the display may be a touch screen further configured to receive user touch input (e.g., operating as an HMI control), while in other cases the display may be an output device only, without also having input capabilities.

The vehicle computing system 110 may interface with a wireless transceiver configured to communicate with the mobile devices 106 of the vehicle occupants. In an example, when connected to a mobile device 106, the vehicle computing system 110 may utilize the network connectivity of the mobile devices 106 to provide the vehicle computing system 110 with connectivity to the communications network.

In some examples, the wireless transceiver of the vehicle computing system 110 may allow the vehicle computing system 110 to communicate with the wireless sensors 108. As an example, the vehicle computing system 110 may communicate with the wireless sensors 108 to receive the signal strength information between the wireless sensors 108 and the mobile devices 106.

The wireless sensors 108 may be used by the mobile devices 106 and/or the vehicle computing system 110 to attempt an instantaneous triangulation of the mobile device 106 within the vehicle 102. However, the mobile device 106 might be located in a zone 104 of the vehicle 102 that is used for storage, such as the center console to which multiple persons within the vehicle 102 might have access to place their mobile devices 106, causing ambiguous results as the wireless sensors 108 may be unable to reliably determine ownership of the mobile device 106 in question.

An improved identification of ownership of the mobile devices 106 may be performed over time when the user enters or exits the vehicle 102. A model of sensor data over time received from the wireless sensors 108 may be used by the mobile devices 106 and/or the vehicle computing system 110 to determine through which one of a predetermined set of identifiable entrances and exits to the vehicle 102 the mobile device 106 has passed. Using the model, the mobile device 106 may be associated with a door of entry, and may be assumed to be the mobile device 106 of the passenger in that seating zone 104, regardless of later changes in location of the mobile device 106.

Figure 2A:
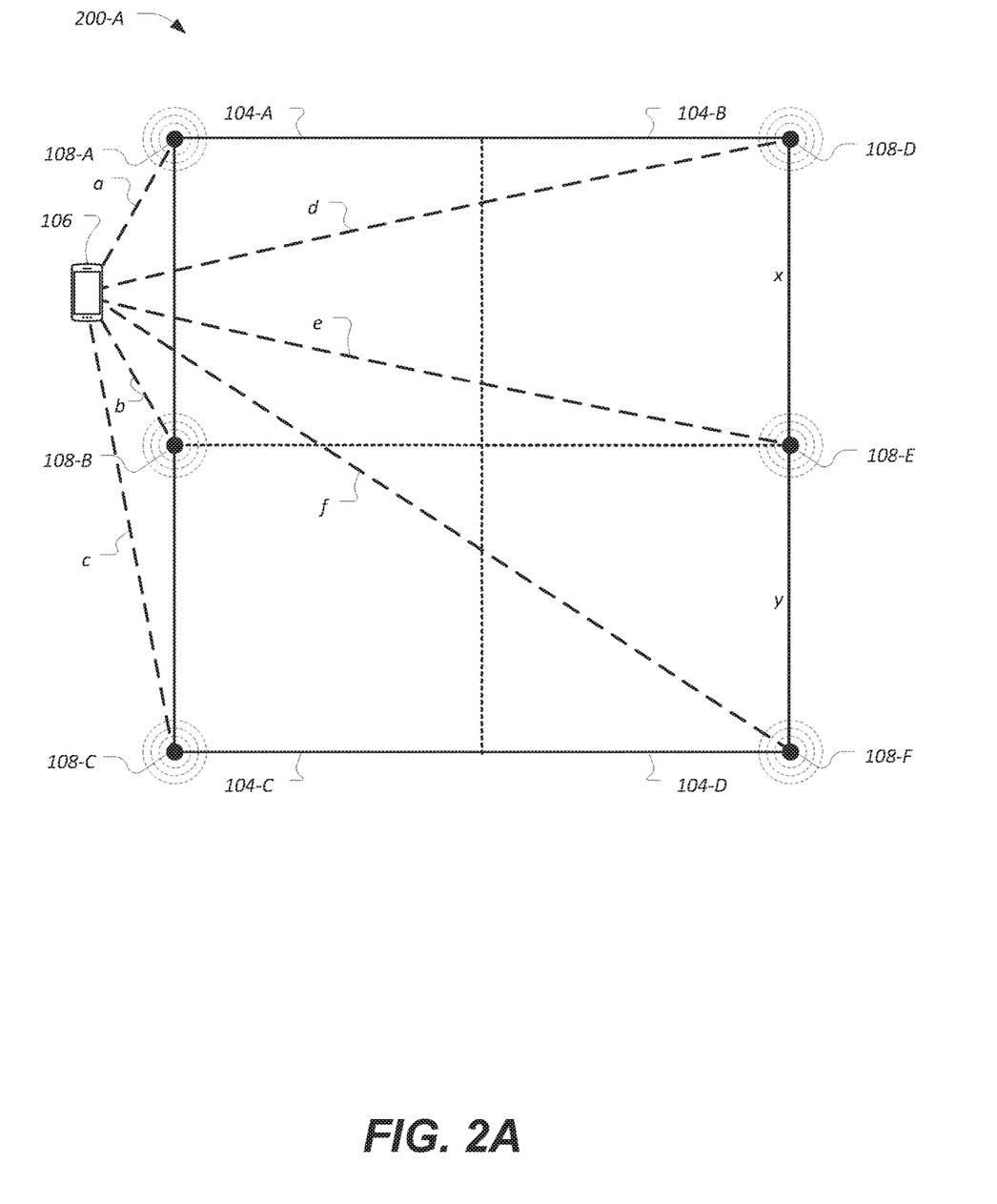
FIGS. 2A-2C illustrate an example diagram of movement of a mobile device into the driver seating zone of the vehicle.
Figure 2B:
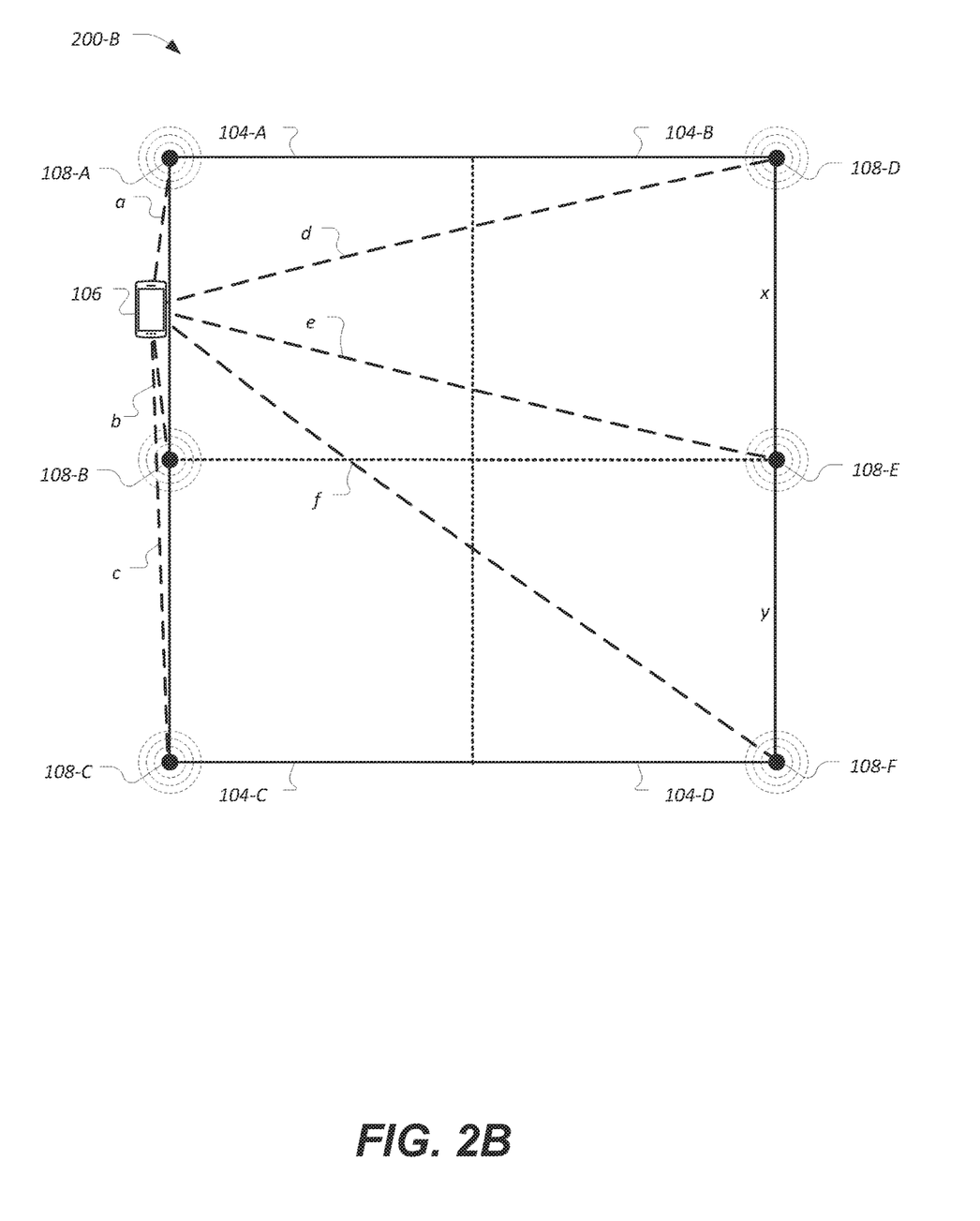
Figure 2C:
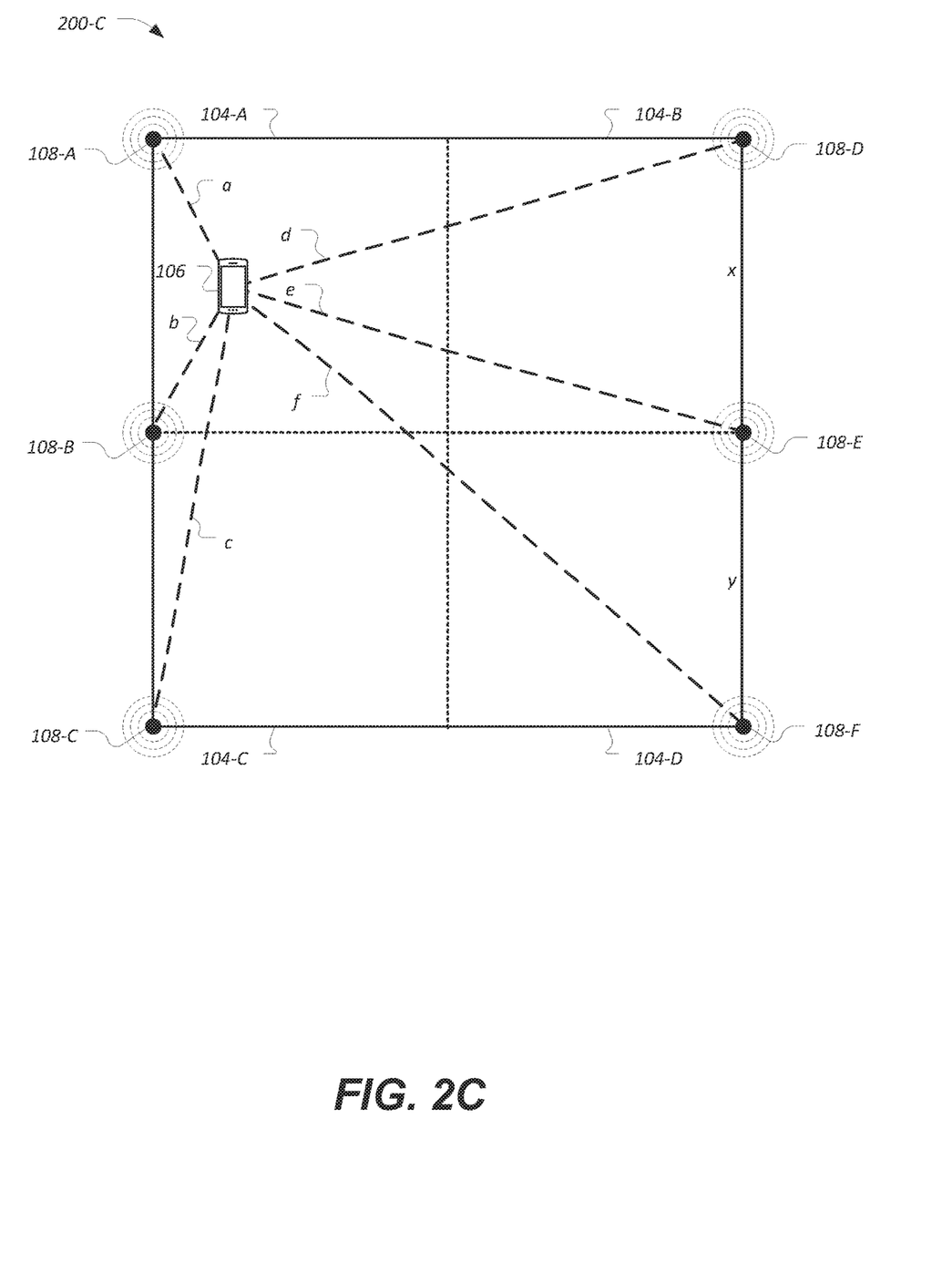

FIGS. 2A-2C illustrate an example 200 of movement of a mobile device 106 into the driver seating zone 104 of the vehicle 102. FIG. 2A illustrates an example 200-A including the mobile device 106 before the mobile device 106 has begun to enter the vehicle 102. FIG. 2B illustrates an example 200-B including the mobile device 106 as the mobile device 106 is entering the vehicle 102. FIG. 2C illustrates an example 200-C including the mobile device 106 having entered the vehicle 102. Moreover, each of the examples 200-A through 200-C illustrates a state of the signal strength/distance information collected from the wireless sensors 108 by the vehicle computing system 110 during entry of a user into the vehicle 102.

The distance between each wireless sensor 108 and the mobile device 106 may be tracked. As shown, the distance between the wireless sensor 108-A and the mobile device 106 is indicated as the distance a, the distance between the wireless sensor 108-B and the mobile device 106 is indicated as the distance b, the distance between the wireless sensor 108-C and the mobile device 106 is indicated as the distance c, the distance between the wireless sensor 108-D and the mobile device 106 is indicated as the distance d, the distance between the wireless sensor 108-E and the mobile device 106 is indicated as the distance e, and the distance between the wireless sensor 108-F and the mobile device 106 is indicated as the distance f. It should be noted that many examples herein reference the values a, b, c, d, e, and f in terms of distance, in which lower values indicate closer proximity. In other examples however, the values a, b, c, d, e, and f may be signal strength values in which higher values indicate closer proximity. In examples in which the values a, b, c, d, e, and f relate to signal strength, the analysis in terms of increasing and decreasing values may be reversed.

In the illustrated examples 200-A through 200-C, the vehicle 102 includes four seating zones 104-A through 104-D. The example 200 also includes six wireless sensors 108-A through 108-F surrounding doors to the four seating zones 104-A through 104-D. The wireless sensors 108 in the example 200 may be aligned in the pillars of the vehicle 102 to provide data representative of path taken by a person who passes to enter one of the zones 104 of the vehicle 102 through a respective vehicle 102 door. There are four pairs of wireless sensors 108 that represent each door: (108-A, 108-B) for the driver door, (108-B, 108-C) for the driver-side rear door, (108-D, 108-E) for the front passenger door, and (108-E, 108-F) for the passenger-side rear door. The ordering of the wireless sensors 108 may be previously stored, or in other examples may be received by the mobile device 106 from information broadcast or otherwise provided by the wireless sensors 108.

Moreover, the distance between the wireless sensors 108 which are part of each pair may be defined. For instance, the distance between wireless sensors 108-A and 108-B may be referred to as x, and the distance between wireless sensors 108-A and 108-B may be referred to, for sake of example, as y. These distances may also be previously stored, or in other examples may be received by the mobile device 106 from information broadcast or otherwise provided by the wireless sensors 108. The distance values may be useful, for example, as when a device passes between two sensors 108, the combined distance of the device from each sensor 108 between which the device passes should approach the total distance between the wireless sensors 108.

The mobile device 106 may be configured to communicate with the vehicle 102. When the mobile device 106 arrives into range of the wireless sensors 108 of the vehicle 102 (e.g., within range of BLE advertisements of the wireless sensors 108), the mobile device 106 may initiate tracking of the values a, b, c, d, e, and f. For instance, the mobile device 106 may maintain information indicative of the values a, b, c, d, e, and f over time in a memory of the mobile device 106.

Using the values a, b, c, d, e, and f the mobile device 106 may compute values corresponding to each of the doors to the seating zones 104 of the vehicle 102. These values corresponding to each of the doors to the seating zones 104 may be referred to as monitor pair values. Each monitor pair value may be based on distance values for the wireless sensors 108 located on either side of the door. For instance, for the seating zone 104-A the mobile device 106 may compute the monitor pair value a+b, for the seating zone 104-C the mobile device 106 may compute the monitor pair value b+c, for the seating zone 104-B the mobile device 106 may compute the monitor pair value d+e, and for the seating zone 104-D the mobile device 106 may compute the monitor pair value e+f. These values may be tracked by the mobile device 106 over time to identify trends in the values indicative of seating zone 104 location of the entering user.

Figure 3:
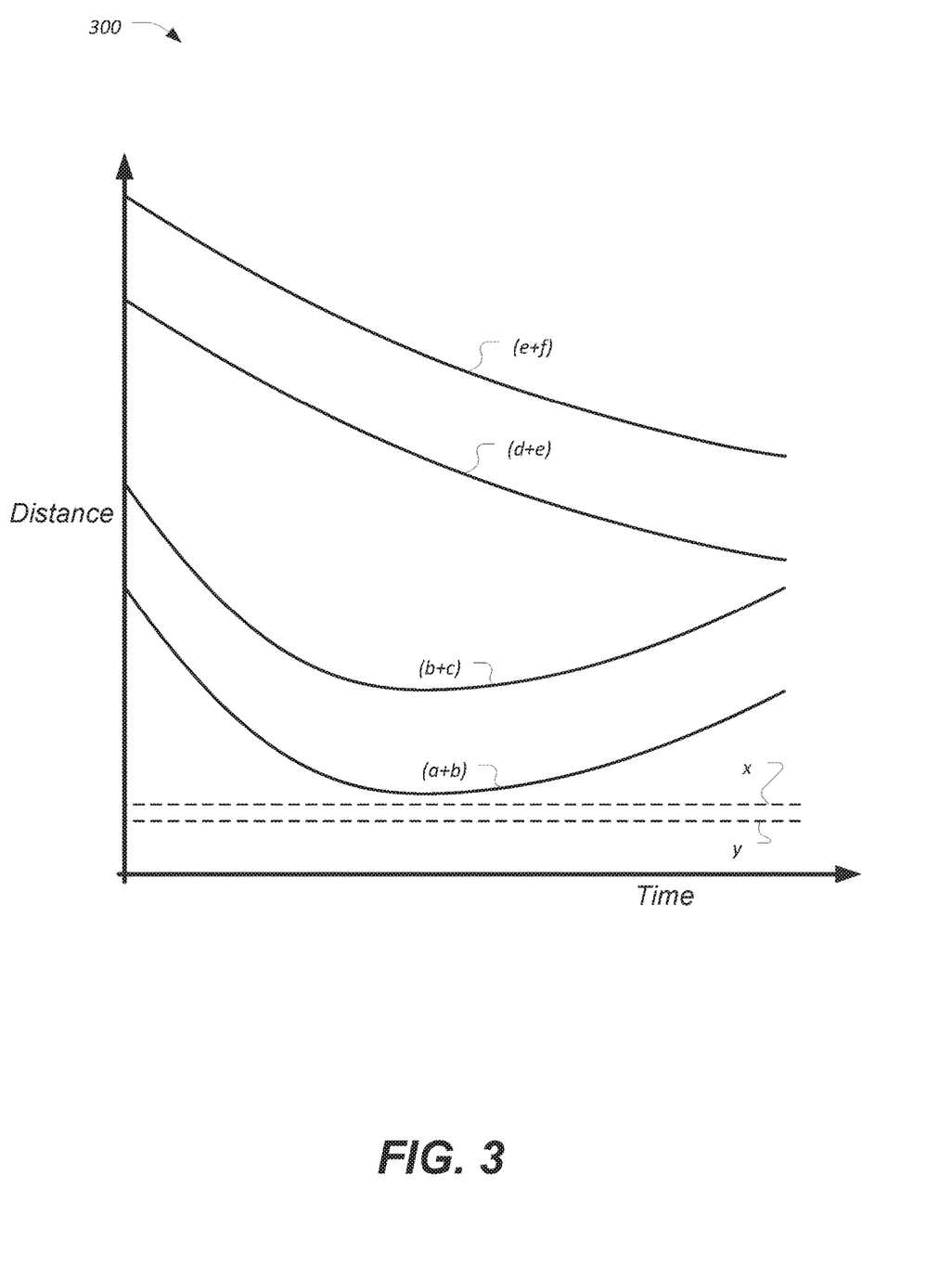
FIG. 3 illustrates an example graph of values corresponding to the movement of the mobile device into the driver seating zone of the vehicle.

FIG. 3 illustrates an example graph 300 of values corresponding to the movement of the mobile device 106 into the driver seating zone of the vehicle 102. The graph 300 may be representative, for example, of the monitor pair values a+b, b+c, d+e, and e+f tracked by the mobile device 106 illustrated in the example 200 above.

Continuing with the example 200, the user approaches the vehicle 102 and enters through the driver door while carrying the mobile device 106. Consistent with the movement, and as shown in the graph 300, the tracking of the monitor pair value a+b over the time period yields a roughly parabolic shape, which declines as the mobile device 106 approaches the wireless sensors 108-A and 104-B, and then inclines as the as the mobile device 106 passes the vehicle 102 threshold and increases in distance from the wireless sensors 108-A and 104-B. The minimum value of the monitor pair a+b may approach the distance value x for the distance between wireless sensors 108-A and 104-B, such that the value of the monitor pair a+b at its minimum point is approximately x.

Also as shown in the graph 300, the tracking of the monitor pair value b+c over the time period yields a roughly parabolic shape that first declines and then inclines. As compared to the monitor pair value a+b, the minimum of the value of the monitor pair b+c is reaches at a relatively higher distance than the distance of the monitor pair value a+b to the value x, and the monitor pair value b+c does not approach y as compared to the relatively closer proximity of the monitor pair value a+b to x. As additionally shown, the monitor pair values d+e and e+f each illustrate a consistent decline. However, the values of the monitor pair values d+e and e+f are greater than the values of the monitor pairs a+b and b+c.

Based on the tracking of the monitor pair values a+b, b+c, d+e, and e+f the mobile device 106 may determine that the mobile device 106 has passed between the wireless sensors wireless sensors 108-A and 104-B. Based on the continuing negative slope of the monitor pair values d+e and e+f the mobile device 106 may determine that the mobile device 106 has entered the vehicle 102 (i.e., and did not subsequently exit). Accordingly, based on the locations of the wireless sensors 108-A and 104-B in the vehicle 102, the mobile device 106 may determine that the mobile device 106 has entered the driver seating zone 104-A. According to this determination, the mobile device 106 may interact with the vehicle computing system 110 as the driver device.

Figure 4:
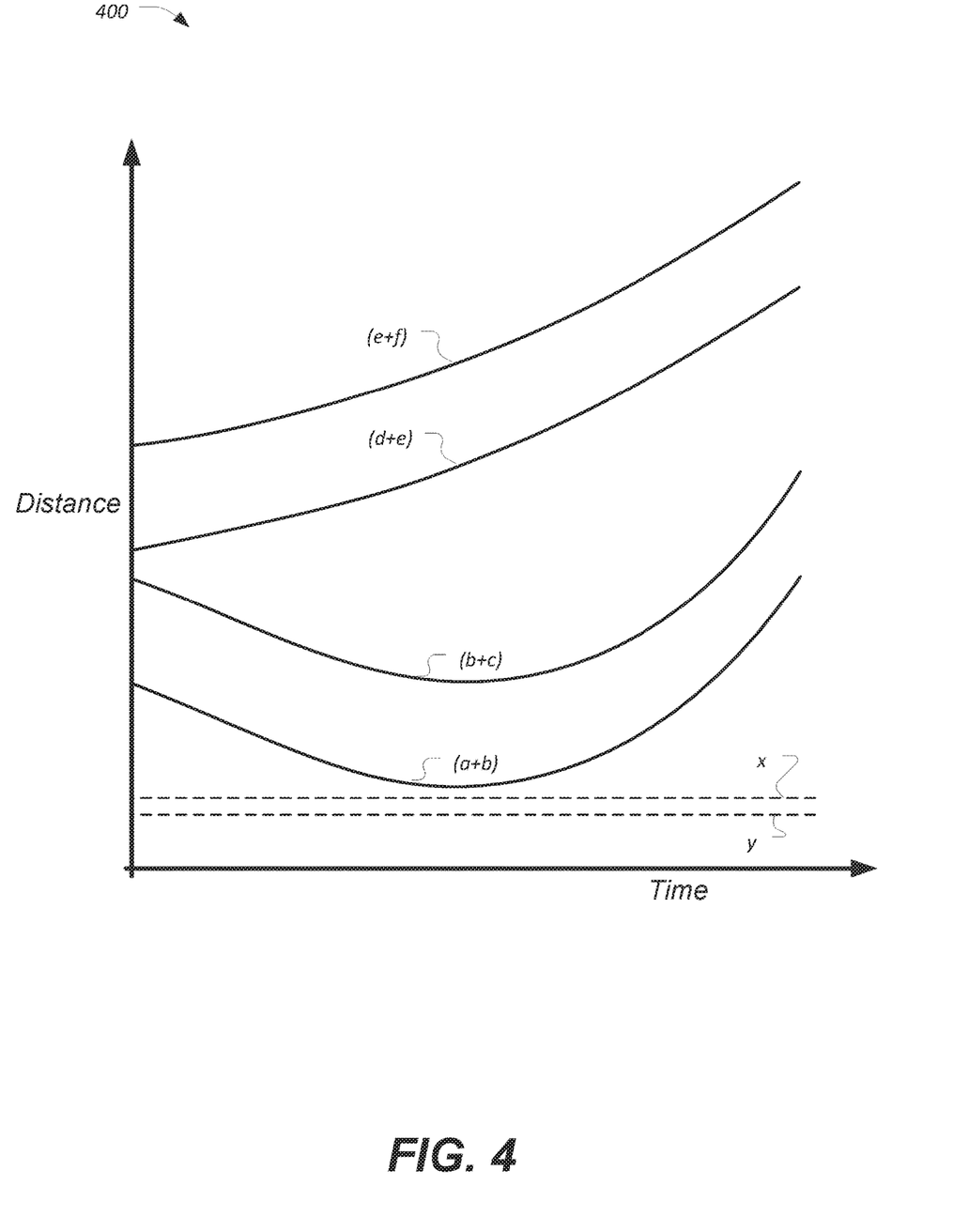
FIG. 4 illustrates an example graph of values corresponding to the movement of the mobile device exiting the vehicle.

FIG. 4 illustrates an example graph 400 of values corresponding to the movement of the mobile device 106 exiting the vehicle 102. When the driver exits the vehicle 102, the values of the monitor pairs a+b and b+c in the graph 400 are somewhat similar to the values of the monitor pairs a+b and b+c in the graph 300, as in each example the values of the monitor pairs a+b and b+c form relatively parabolic shapes when observed over time. However, in contrast to the descending values of the monitor pairs d+e and e+f in the graph 300, during exiting conditions the values of the monitor pairs d+e and e+f indicate a consistent increase. Because of the positive slopes of the monitor pair values from the wireless sensors 108 on the opposite side of the vehicle 102 from the monitor pair values having parabolic movements, the mobile device 106 may determine that the mobile device 106 exited the vehicle 102. Moreover, and similar to as discussed above with respect to the graph 300, the mobile device 106 may infer that the exit was through the driver door as the value of the monitor pair a+b is of a smaller distance as compared to the value of the monitor pair b+c, and further that the value of the monitor pair a+b more closely approaches the value x, as compared to the approach of the value of the monitor pair b+c approach to the value y. According to this determination, the mobile device 106 may be removed from association with the driver seating zone 104-A.

Figure 5:
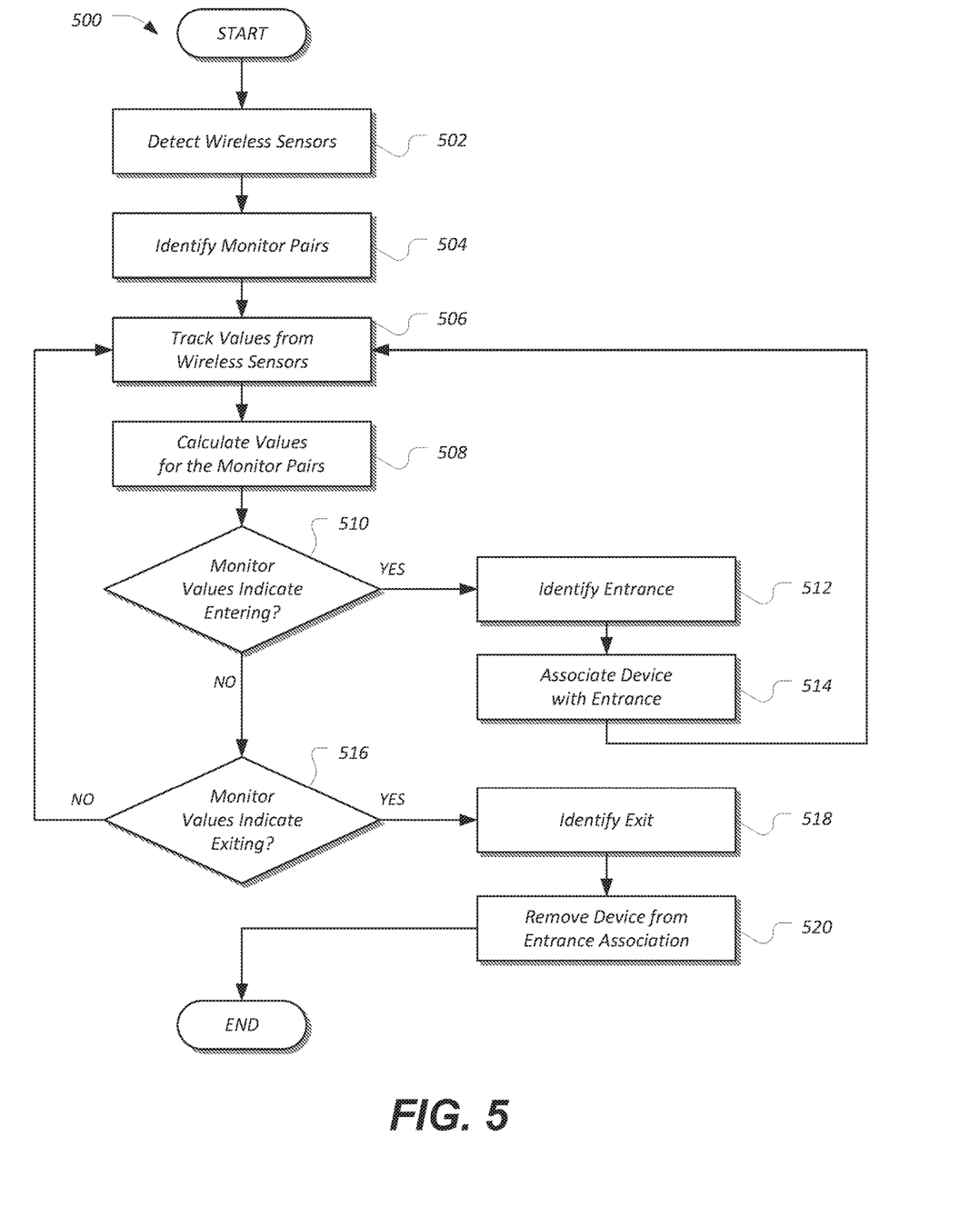
FIG. 5 illustrates an example process for determining seating zones for mobile devices.

FIG. 5 illustrates an example process 500 for determining seating zones 104 for mobile devices 106. In an example, the process 500 may be performed by the mobile device 106.

At operation 502, the mobile device 106 detects wireless sensors 108. In an example, the wireless sensors 108 of the vehicle 102 may advertise as BLE Peripherals, and the mobile device 106 may scan for BLE Peripherals as a BLE Central. When wireless sensors 108 are located, the mobile device 106 may extract information from the wireless sensors 108 to identify the locations of the wireless sensors 108 within the vehicle 120. In an example, the wireless sensors 108 may provide information indicating the side of the vehicle 102 on which the wireless sensor 108 is located, as well as a number or other indication of the ordering of the wireless sensor 108 (e.g., zero for the front-most wireless sensor 108, one for the next wireless sensor 108 behind the front-most wireless sensor 108 towards the rear of the vehicle 102, etc.). The wireless sensors 108 may further provide information indicative of their relative distance to one another. In an example, the wireless sensors 108 may provide information indicative of the distance between the wireless sensor 108-A and the next wireless sensor 108-B. In other examples, the information relating to the sensor locations and distances may be previously stored to the mobile device 106.

At operation 504, the mobile device 106 identifies monitor pairs. In an example, based on the information from the wireless sensors 108, the mobile device 106 may identify monitor pairs as including adjacent wireless sensors 108 on each side of the vehicle 102. For instance, for the vehicle 102 illustrated in the example system 100 having three wireless sensors 108 on each side of the vehicle 102 (e.g., wireless sensors 108-A, 108-B, 108-C on the driver side and wireless sensors 108-D, 108-E, 108-F on the passenger side), the mobile device 106 may identify monitor pairs as the two areas between the three wireless sensors 108 on each side of the vehicle 102 (e.g., monitor pairs a+b, b+c, d+e, and e+f). The mobile device 106 may also associate the monitor pairs with seating zones 104 of the vehicle. In an example, the mobile device 106 may associate the driver-side monitor pairs with driver-side seating zones 104 from front to back of the vehicle 102, and may associate the passenger-side monitor pairs with passenger-side seating zones 104 from front to back of the vehicle 102.

At operation 506, the mobile device 106 tracks values from the wireless sensors 208. In an example, the mobile device 106 receives distance values from each of the wireless sensors 208 within range of the mobile device 106. Continuing with the example, the mobile device 106 receives distance values a, b, c, d, e, and f from each of the wireless sensors 108-A, 108-B, 108-C, 108-D, 108-E, and 108-F, respectively.

At operation 508, the mobile device 106 calculates values for the monitor pairs. In an example, the mobile device 106 may determine the monitor pair values as a sum of the distance values of each of the wireless sensors 108 surrounding the monitor pair. For instance, the mobile device 106 may compute the monitor pair value a+b from a sum of the values of a and b, the monitor pair value b+c from a sum of the values of b and c, the monitor pair value d+e from a sum of the values of d and e, the monitor pair value e+f from a sum of the values of e and f. In other cases, the monitor pair values may be computed using other operations, such as by averaging the values of each of the wireless sensors 108 surrounding the monitor pair as another possibility.

At operation 510, the mobile device 106 determines whether the values for the monitor pairs indicate the mobile device 106 is entering the vehicle 102. In an example, the mobile device 106 may observe the values of the monitor pairs over time and may identify whether the monitor pairs on one side of the vehicle 102 form parabolic values and decrease and increase over time, while the monitor pairs on the other side of the vehicle 102 form decreasing values over time. If so, control passes to operation 512. Otherwise, control passes to operation 516.

At operation 512, the mobile device 106 identifies the entrance through which the mobile device entered the vehicle 102. In an example, the mobile device 106 may identify the entrance through which the mobile device 106 entered the vehicle 102 as being the entrance associated with the monitor pair forming a parabolic shape but having the highest signal strength or shortest distance at its minimum point. Additionally or alternately, the mobile device 106 may identify or confirm the entrance according to whether the minimum value of the monitor pair approaches a distance value corresponding to the distance between the wireless sensors 108 between which the mobile device 106 passed.

At operation 514, the mobile device 106 associates the mobile device 106 with the seating zone 104 of the vehicle 102 associated with the entrance. In an example, the mobile device 106 may identify the seating zone 104 for the mobile device 106 as the seating zone 104 accessed by the vehicle 102 door around which the values used to compute the monitor pair are computed. For instance, if the monitor pair through which the mobile device 106 entered is the frontmost driver-side monitor pair, the mobile device 106 may be associated with the seating zone 104-A. Or, if the monitor pair through which the mobile device 106 entered is a passenger-side second-row monitor pair, the mobile device 106 may be associated with the seating zone 104-D. After operation 514, control passes to operation 506 to identify further devices entering or clearing from seating zones 104. (In other examples, once the seating zone 104 for the mobile device 106 is identified, the process 500 ends.)

At operation 516, the mobile device 106 determines whether the values for the monitor pairs indicate the mobile device 106 is exiting the vehicle 102. In an example, the mobile device 106 may observe the values of the monitor pairs over time and may identify whether the monitor pairs on one side of the vehicle 102 form parabolic values that decrease and then increase over time, while the monitor pairs on the other side of the vehicle 102 form increasing values over time. If so, control passes to operation 518. Otherwise, control passes to operation 506.

At operation 518, the mobile device 106 identifies the exit through which the mobile device left the vehicle 102. In an example, the mobile device 106 may identify the exit through which the mobile device 106 left the vehicle 102 as being the exit associated with the monitor pair forming a parabolic shape but having the highest signal strength or shortest distance at its minimum point. Additionally or alternately, the mobile device 106 may identify or confirm the exit according to whether the minimum value of the monitor pair approaches a distance value corresponding to the distance between the wireless sensors 108 between which the mobile device 106 passed.

At operation 520, the mobile device 106 removes the mobile device 106 from the association with the seating zone 104 of the vehicle 102 associated with the exit. After operation 520, the process 500 ends.

Thus, sensor data may be used to determine passage of a mobile device 106 through one of a predetermined set of identifiable entrances and exits in the vehicle 102, such as the driver's door, the front passenger door, and rear doors in the vehicle 102. Based on the determination, the mobile device 106 may be associated with the door of entry, and may be assumed to be the mobile device 106 of that passenger, regardless of later changes in mobile device 106 location. This information may further be used, for example, to identify or confirm which mobile device 106 is the driver mobile device 106, and which mobile device(s) 106 in the vehicle 102 belong to which passengers.

Variations on the described system 100 are possible. As one possibility, the vehicle computing system 110 may be configured to receive signal strength or distance information from the wireless sensors 108 corresponding to one or more mobile devices 106 interacting with the wireless sensors 108. Using the information, the vehicle computing system 110 may be configured to perform the determination of which device is associated with what seating zone 104 of the vehicle 102. Moreover, in examples in which the vehicle computing system 110 performs the determination of seating zone 104, the vehicle computing system 110 may be able to automatically identify which mobile device 106 entering the vehicle 102 is the driver mobile device 106 as well as when the driver mobile device 106 has exited the vehicle. Further, the vehicle computing system 110 may be configured to maintain information indicative of the arrangement of the wireless sensors 108 and the distances between the wireless sensors 108, such that the vehicle computing system 110 may make the determination of mobile device 106 seating zone 104 without querying for such information.

Computing devices described herein, such as the mobile devices 106 and vehicle computing system 110, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C #, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   wireless sensors of a vehicle; and
   a vehicle processor programmed to
   track values from the sensors indicative of distance between a mobile device and the sensors;
   calculate pair values as sums of the values received from pairs of the sensors proximate vehicle entrances; and
   identify one of the entrances through which the mobile device passed according to the pair value with a minimum value closest to a distance between the pair of the sensors.

2. The system of claim 1, wherein the processor is further programmed to identify the mobile device to the vehicle as being located within a driver seating zone when the one of the entrances through which the mobile device entered the vehicle is identified as being a front-most driver-side door.

3. The system of claim 1, wherein the processor is further programmed to, when the pair values for a first side of the vehicle indicate an approach of the device to and then a departure of the device from the first side of the vehicle and the pair values for a second side of the vehicle indicate consistent approach of the device to the second side of the vehicle, identify the mobile device as having entered the vehicle.

4. The system of claim 1, wherein the processor is further programmed to, when the pair values for a first side of the vehicle indicate an approach of the device to and then a departure of the device from the first side of the vehicle and the pair values for a second side of the vehicle indicate consistent departure of the device from the second side of the vehicle, identify the mobile device as having exited the vehicle.

5. A method comprising:
   associating, by a vehicle processor, a mobile device with a vehicle entrance proximate a pair of wireless vehicle sensors based on sensor values received from the pair of sensors having a smallest summed distance minimum value over a predetermined time period relative to summed values received from other sensor pairs.

6. The method of claim 5, wherein the vehicle entrance is an entrance to a driver seating zone, and further comprising identifying the mobile device to the vehicle as being located within the driver seating zone.

7. The method of claim 6, further comprising, when the values over time indicate approach and then departure of the device from a first side of the vehicle and consistent approach of the device to a second side of the vehicle, identify the mobile device as having entered the vehicle.

8. The method of claim 6, further comprising, when the values over time indicate approach and then departure of the device from a first side of the vehicle and consistent departure of the device from a second side of the vehicle, removing association of the device with the seating zone.

9. The method of claim 5, further comprising, confirming the vehicle entrance through which the mobile device entered the vehicle according to whether a minimum value of a sum of values from wireless sensors surrounding the vehicle entrance approaches a distance value corresponding to the distance between the wireless sensors surrounding the vehicle entrance.

10. The method of claim 5, wherein the values from the wireless sensors include one or more of signal strength values or distance measures.

* * * * *